Feb. 1, 1955
T. A. KUDLACIK
2,700,893
BALANCING DEVICE
Filed Aug. 6, 1952
2 Sheets-Sheet 1
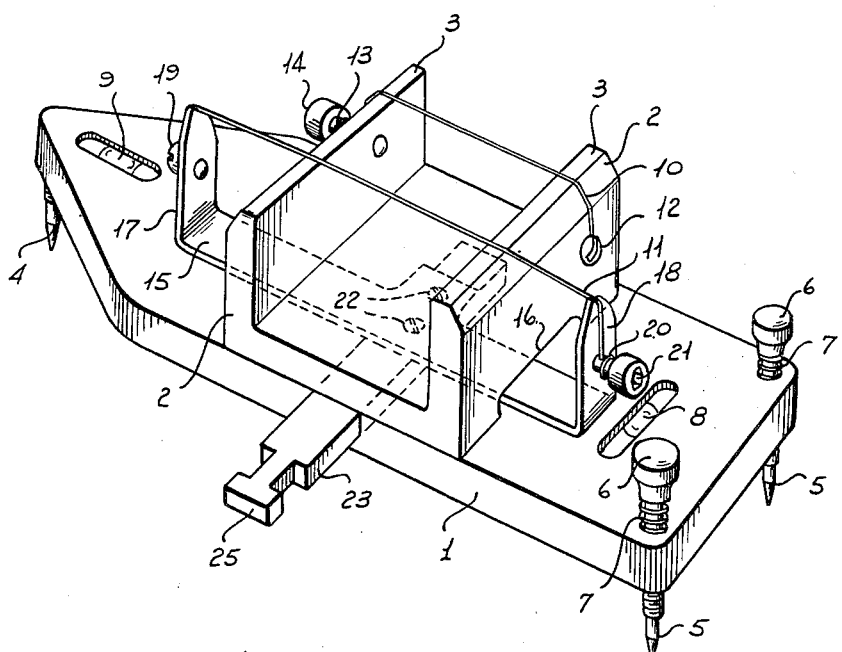
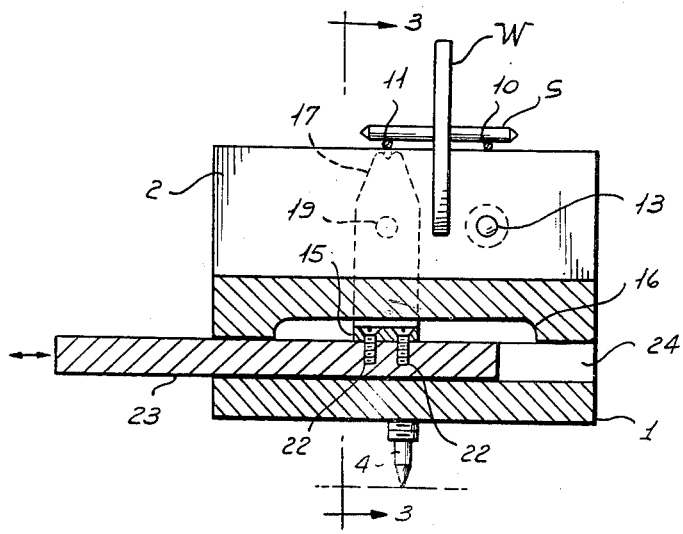
INVENTOR.
TEDDY A. KUDLACIK
BY Cornelius Zabriskie
ATTORNEY Feb. 1, 1955  T. A. KUDLACIK  2,700,893
BALANCING DEVICE
Filed Aug. 6, 1952  2 Sheets-Sheet 2
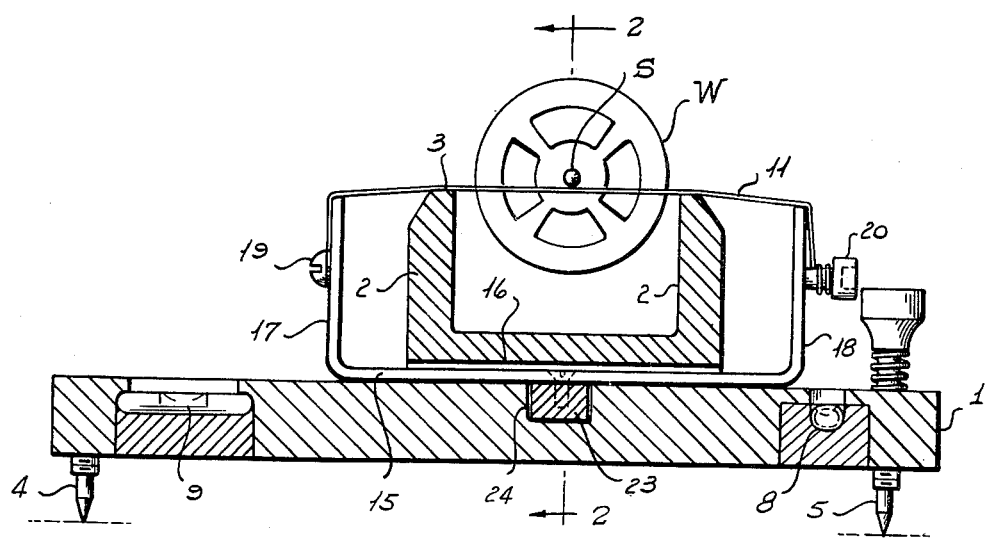
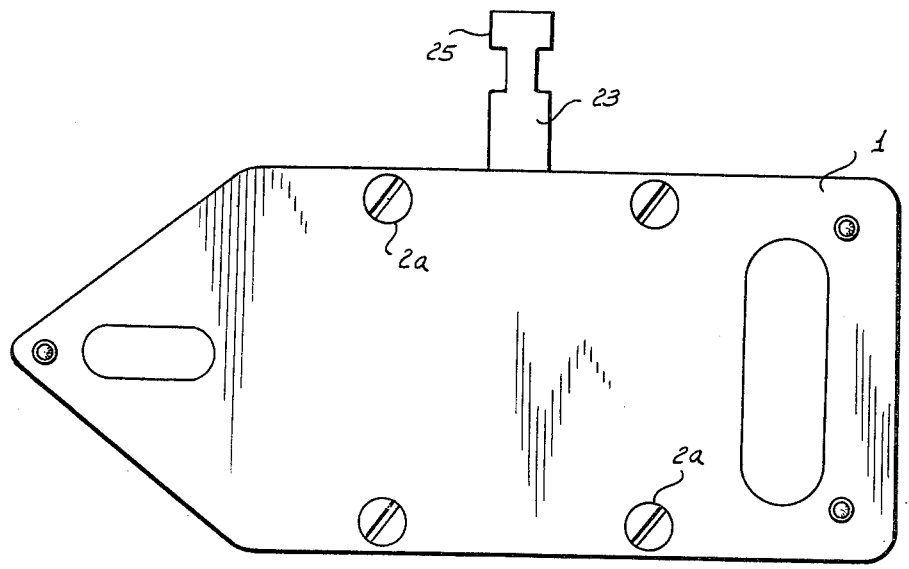
INVENTOR.
TEDDY A. KUDLACIK
BY Cornelius Zabriskie
ATTORNEY

United States Patent Office 2,700,893
Patented Feb. 1, 1955

2,700,893

BALANCING DEVICE

Teddy A. Kudlacik, Brooklyn, N. Y.

Application August 6, 1952, Serial No. 302,863

6 Claims. (Cl. 73—66)

This invention is a device for testing for balance the wheels of clocks, gyroscopes and other circular objects designed to turn on shafts or spindles.

It has long been the practice to balance such wheels by supporting their shafts on rigid parallel knife edges arranged in spaced apart relation in a common horizontal plane, so that when thus supported, gravity may act upon any preponderant portion of the wheel and cause it to turn until the heavy portion is lowermost. By closely watching the wheel and noting the portion which invariably tends to gravitate, the heavy side of the wheel is indicated and portions thereof may be removed by filing, boring holes therein or otherwise to effect the desired equipoise. Or the lighter side of the wheel may be weighted by adding additional weights in the form of screws or otherwise to counterbalance the heavy side of the wheel. The manner in which the wheel is actually balanced is not material to this invention, the invention being directed, rather, to the provision of a device of maximum sensitivity for so supporting the wheel that even though it is imperceptibly out of balance, that fact will immediately be apparent.

I have found, as a result of protracted experimentation and numerous tests, that the determination of lack of balance of a wheel or other rotary member can be most accurately determined if the shaft of such wheel is supported upon spaced apart wires arranged in a common horizontal plane and tensioned sufficiently to properly support the weight of the wheel and its shaft without undue sagging.

In carrying out the present invention, two wires are strung in spaced apart parallel relation between appropriate supports and said wires are placed under tension, after the manner of tensioning a musical string, by any appropriate means which will impart the desired tension to these wires and maintain such tension against slipping. The wires and their support are mounted upon an appropriate base with means for leveling the same so as to insure accurate results. If desired, means may be provided for adjusting the spacing between the wires to wheels of different axial lengths so that they may be supported to the best advantage, according to their individual dimensions.

An important feature of the present invention and one which differentiates it from all prior practice is that the wires under tension will be in slight motion or vibration at practically all times. In fact, such wires are seldom, if ever, absolutely quiescent or at rest. There is invariably some slight vibration in wires under tension, due to circulation of air in the vicinity, vibration imparted from movement in the vicinity or even slight vibration due to audible speech. Consequently when a wheel or arbor is supported on wires in accordance with the present invention, the resulting support is dynamic and kinetic in contradistinction to the static support afforded by the rigid knife edges of the prior practice. Such a dynamic support promotes rotation of the wheel under the slightest lack of equilibrium or equipoise. Moreover, the wires, being drawn to a very smooth surface in the ordinary course of their manufacture, present practically no friction to a shaft resting thereon and thus render the support even more sensitive than could possibly be the case with knife edges, which are almost impossible to keep in proper condition.

The present invention therefore differs in structure from prior balancing devices employing a static support and also differs therefrom in the new mode of operation of employing the dynamic or kinetic support to which reference has been made.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 is a perspective view of a device embodying the present invention.

Fig. 2 is a transverse section substantially midway of the length of the same, said section being taken in the plane of the line 2—2 of Fig. 3.

Fig. 3 is a longitudinal section taken in the plane of line 3—3 of Fig. 2.

Fig. 4 is an underneath plan view of the device.

Referring to the drawings, 1 designates an appropriate base on which is rigidly mounted an abutment member held in place by screws 2a (Fig. 4) and having two upstanding abutments 2, arranged in parallel spaced apart relation to one another and having upper edges 3 which are parallel to one another and spaced apart a distance in excess of the diameter of the wheel or arbor to be balanced on the device.

One end of the base has a centrally located single supporting foot 4 which may be rigid with the base and projects below the same. The opposite end of the base is provided with two leveling screws 5 arranged near its opposite edges and having knurled heads 6 to facilitate their adjustment. Helical springs 7 are coiled around the screws between the base and the head 6 and frictionally hold these screws against inadvertent rotation.

Within the base 1 is mounted a transverse spirit level 8 and a longitudinally disposed spirit level 9. These levels may be let into the base from the under side thereof and held in place in any appropriate manner, as by a cement. Through manipulation of the leveling screws 5, the base may be leveled, with the result that the upper edges 3 of the abutments 2 are accurately positioned in the same horizontal plane.

Across the edges 3 are stretched two wires 10 and 11. The wire 10 is anchored in fixed position at one end by a screw 12 and at the other end passes through a hole in the tensioning pin 13 provided with a head 14 having therein a hexagonal socket into which an Allen wrench may be inserted, to wrap a portion of the wire upon the pin 13 for the purpose of placing such wire under the desired tension. The pin 13 is tapered and fits into a tapered hole in the corresponding abutment 2, so that it is held against inadvertent rotation in the same manner as the conventional string key of a violin. The other wire 11 is supported at its opposite ends upon a yoke 15 which extends freely through a cutout or recess 16 in the base of the abutment member and is provided at its opposite ends with upstanding extensions 17 and 18. One end of the wire 11 is permanently anchored by a screw 19 to the extension 17 of the yoke 15, while the other end of said wire is passed through a hole in a tapered tensioning pin 20, also having a head with a socket 21 to receive an Allen wrench. By rotation of the tapered pin 20, the wire 11 may be placed under tension.

The yoke 15 is secured by screws 22 to a bar 23 mounted to slide in the slot 24 in the upper surface of the base 1 beneath the abutment member. The near end of this member projects beyond the base to form a finger piece 25 whereby, through longitudinal movement of the bar 23, the wire 11 may be moved toward or away from the permanently stationary wire 10 in accordance with the spacing dictated by the axial thickness of the wheel or arbor to be balanced. Both wires are drawn taut across the upper edges 3 of the abutments and under sufficient tension to properly support the weight of the wheel, indicated W, and its shaft S. It is of course preferred that the wires be of substantially the same tension, but this is not critical so long as it is sufficient to support the weight of the wheel without perceptible sagging. The wire used should be sufficiently hard to resist undesirable stretching and of sufficient gauge to support the weight when under tension. It is desirable, however, to keep the gauge as small as can reasonably carry the load for the smaller wire will produce the best results.

The wheel shown in the drawings is such as would be appropriate to a watch or clock, but it will be understood that any desired circular member which it is desired to place in balance, equilibruim or equipoise may be properly supported in the manner stated on the apparatus such as described, but of appropriate size for the articles to be tested.

The foregoing detailed description sets forth the invention in its preferred practical form but the invention is to be understood as fully commensurate with the appended claims. The steps of balancing a wheel as hereinbefore described constitute a method also forming a part of this invention.

Having thus fully described the invention, what I claim as new and desire to secure by Letters Patent is:

1. A device for balancing wheels or the like which comprises: a base having thereon parallel abutments spaced apart, two horizontal strands of wire bearing on said abutments and extending across the space between said abutments, means for anchoring each wire at the remote side of one abutment, tensioning means supported on the base and connected to the unanchored ends of the strands of wire for placing said strands under tension, said strands being in a common plane, and leveling means also supported on the base for leveling said strands in the same horizontal plane.

2. A device for balancing wheels or the like which comprises: a base having thereon parallel abutments spaced apart, a pair of horizontal wires bearing on said abutments and extending across the space between said abutments, means for anchoring each wire at the remote side of one abutment, a tensioning member supported on the base and secured to the other end of the wire on the remote side of the other abutment for placing said wires under tension, those portions of the wires between the abutments being then in a common horizontal plane, and leveling means also supported on the base for leveling in the same horizontal plane those portions of the wires which extend across the space between the abutments.

3. A device as claimed in claim 2, wherein the leveling means comprises leveling screws.

4. A device as claimed in claim 3, wherein the base is provided with spirit levels arranged longitudinally and transversely of the wires to facilitate the leveling operation.

5. A device for balancing wheels or the like which comprises: a base having abutments providing spaced apart wire supports, leveling screws threaded through the base for leveling the latter and placing said wire supports in the same horizontal plane, spirit levels positioned longitudinally and transversely of the base to facilitate the leveling thereof, a tensioning key carried by the base, a fixed wire bearing on the wire supports and extending across the space between the wire supports, said wire being anchored at one end and secured to said tensioning key at its other end, an adjustable wire also bearing on the wire supports and extending across the space between the wire supports, a yoke one end of which is anchored to one end of the adjustable wire, a tensioning key carried by the other end of the yoke and secured to the other end of the latter wire, and means for slidably supporting said yoke on the base to permit the adjustable wire to be moved sidewise toward and away from the fixed wire while maintaining said wires in parallel relation in the same horizontal plane.

6. A device for balancing wheels or the like which comprises: a base provided with spaced apart abutments, fixed and movable wire strands bearing on said abutments and extending across the space between said abutments in parallel relation and in the same horizontal plane, means for placing and maintaining the fixed wire strand under tension in fixed position with respect to the abutments, means mounted on the base for supporting the movable wire strand for bodily sidewise movement while it is maintained parallel to the fixed wire strand and in the said same horizontal plane therewith, and means mounted on the means for supporting the movable wire strand for placing and maintaining the movable wire strand under tension.

References Cited in the file of this patent

UNITED STATES PATENTS

| Number | Name | Date |
|---|---|---|
| 433,643 | Bowsher | Aug. 5, 1890 |
| 529,178 | Landgraf | Nov. 13, 1894 |
| 2,185,843 | Fraser | Jan. 2, 1940 |
| 2,307,900 | Pilliod et al. | Jan. 12, 1943 |